(12) United States Patent
Meyer et al.

(10) Patent No.: US 7,640,315 B1
(45) Date of Patent: Dec. 29, 2009

(54) IMPLEMENTING LOCKS IN A DISTRIBUTED PROCESSING SYSTEM

(75) Inventors: Derrick R. Meyer, Austin, TX (US); Jonathan M. Owen, Northboro, MA (US); Mark D. Hummel, Franklin, MA (US); James B. Keller, Palo Alto, CA (US)

(73) Assignees: Advanced Micro Devices, Inc., Sunnyvale, CA (US); Alpha Processor, Inc., Concord, MA (US)

( * ) Notice: Subject to any disclaimer, the term of this patent is extended or adjusted under 35 U.S.C. 154(b) by 1367 days.

(21) Appl. No.: 09/633,087

(22) Filed: Aug. 4, 2000

(51) Int. Cl.
*G06F 15/16* (2006.01)

(52) U.S. Cl. .................... 709/210; 709/203; 709/208; 709/209; 709/223; 709/224; 709/225; 709/229; 710/200

(58) Field of Classification Search ............... 709/203, 709/208, 209, 210, 223, 224, 225, 229; 710/200
See application file for complete search history.

(56) References Cited

U.S. PATENT DOCUMENTS

| | | |
|---|---|---|
| 4,725,834 A | 2/1988 | Change et al. |
| 4,750,109 A | 6/1988 | Kita |
| 4,807,118 A | 2/1989 | Lin et al. |
| 4,922,408 A | 5/1990 | Davis et al. |
| 4,984,153 A | 1/1991 | Kregness et al. ............ 364/200 |

(Continued)

OTHER PUBLICATIONS

Charney, Mark, "The Role of Network Bandwidth in Barrier Synchronization," p. 202-212, 1995.

(Continued)

*Primary Examiner*—Ario Etienne
*Assistant Examiner*—Barbara N Burgess
(74) *Attorney, Agent, or Firm*—Meyertons, Hood, Kivlin, Kowert & Goetzel, P.C.

(57) ABSTRACT

A messaging scheme to synchronize processes within a distributed memory multiprocessing computer system having two or more processing nodes interconnected using an interconnect structure of dual-unidirectional links. Each unidirectional link forms a point-to-point interconnect to transfer packetized information between two processing nodes. A lock acquisition request from a lock requesting node is placed into service by an arbitrating node when no previous lock requests are pending for service. The arbitrating node transmits a broadcast message to all nodes in the system, which, in turn, respond with a corresponding probe response message to inform the arbitrating node of cessation of issuance of new requests by the node sending the probe response message. The arbitrating node informs the lock requesting node of the requesting node's lock ownership by transmitting a target done message thereto. After completion of lock operations, the lock requesting node sends a lock release request to the arbitrating node, which, in turn, informs all processing nodes of lock release by transmitting another broadcast message within the system. The messaging protocol is completed when each node sends another probe response to the arbitrating node, which, in turn, sends a final target done message to the lock requesting node. Lock operations are performed without contention for system resources and without deadlocks among various processing nodes.

15 Claims, 13 Drawing Sheets

U.S. PATENT DOCUMENTS

| | | | |
|---|---|---|---|
| 5,055,999 | A | 10/1991 | Frank et al. |
| 5,175,837 | A | 12/1992 | Arnold et al. |
| 5,341,483 | A | 8/1994 | Frank et al. |
| 5,351,043 | A | 9/1994 | Hullett et al. |
| 5,495,481 | A | 2/1996 | Duckwall |
| 5,502,840 | A | 3/1996 | Barton |
| 5,506,961 | A | 4/1996 | Carlson et al. |
| 5,548,728 | A | 8/1996 | Danknick |
| 5,579,504 | A | 11/1996 | Callander et al. |
| 5,592,486 | A | 1/1997 | Lo et al. |
| 5,649,157 | A | 7/1997 | Williams |
| 5,657,472 | A | 8/1997 | Van Loo et al. |
| 5,774,731 | A * | 6/1998 | Higuchi et al. .............. 710/200 |
| 5,860,159 | A | 1/1999 | Hagersten |
| 5,875,485 | A | 2/1999 | Matsumoto |
| 6,148,300 | A | 11/2000 | Singhal et al. |
| 6,163,855 | A * | 12/2000 | Shrivastava et al. ............ 714/4 |
| 6,473,849 | B1 * | 10/2002 | Keller et al. .................. 712/30 |
| 6,480,918 | B1 | 11/2002 | McKenney et al. |
| 6,523,066 | B1 * | 2/2003 | Montroy et al. ............. 709/229 |
| 6,920,454 | B1 * | 7/2005 | Chan ............................ 707/8 |

OTHER PUBLICATIONS

Dijkstra, E.W., "Solution of a Problem in Concurrent Programming Control," Communications of the ACM, vol. 8, No. 9, Sep. 1965, p. 569.

Gustavson, David B., "The Scalable Coherent Interface and Related Standards Projects," IEEE Micro, 1992, p. 10.

Cox, et al., "Adaptive Cache Coherency for Detecting Migratory Shared Data," Proc. 20th Annual Symposium on Computer Architecture, May 1993, pp. 98-108.

Stenstrom, et al., "An Adaptive Cache Coherence Protocol Optimized for Migratory Sharing," Proc. 20.h Annual Symposium on Computer Architecture, May 1993 IEEE, pp. 109-118.

Wolf-Dietrich Weber, et al. "Analysis of Cache Invalidation Patterns in Multiprocessors", Computer Systems Laboratory, Stanford University, CA, pp. 243-256.

Kourosh, et al. "Two Techniques to Enhance the Performance of Memory Consistency Models," 1991 International Conference on Parallel Processing, pp. 1-10.

Li, et al. "Memory Coherence in Shared Virtual Memory Systems," 1986, Proceedings of the fifth annual ACM symposium on Principles of distributed computing ACM, pp. 229-239.

Magnusson, et al., "Queue Locks on Cache Coherent Multiprocessors", IEEE, In Proceedings of the 8th International Symposium on Parallel Processing 1994.

Hagersten, et al., "Simple COMA," Ashley Saulsbury and Anders Landin Swedish Institute of Computer Science, Jul. 1993, pp. 233-259.

Saulsbury, et al., "An Argument for Simple COMA," Swedish Institute of Computer Science, 10 pages.

Anderson, "The Performance of Spin Lock Alternatives for Shared-memory Multiprocessors", IEEE Transactions on Parallel and Distributed Systems, vol. 1, No. 1, Jan. 1990.

\* cited by examiner

| Bit Time | 7 | 6 | 5 | 4 | 3 | 2 | 1 | 0 |
|---|---|---|---|---|---|---|---|---|
| 0 | Command-Specific | | CMD[5:0] | | | | | |
| 1 | Command-Specific | | | | | | | |
| 2 | Command-Specific | | | | | | | |
| 3 | Command-Specific | | | | | | | |

| Bit Time | 7 | 6 | 5 | 4 | 3 | 2 | 1 | 0 |
|---|---|---|---|---|---|---|---|---|
| 0 | Src Unit [1:0] | | CMD[5:0] | | | | | |
| 1 | Command-Specific | | | | | SrcNode[2:0] | | |
| 2 | Command-Specific | | | | | | | |
| 3 | Addr[7:2] | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | Command-Specific | | CMD[5:0] | | | | | |
| 1 | DestNode[2:0] | | | Dest Unit[1:0] | | Command-Specific | | |
| 2 | Command-Specific | | | | | | | |
| 3 | Command-Specific | | | | | | | |

FIG. 4A

| Bit Time | 7 | 6 | 5 | 4 | 3 | 2 | 1 | 0 |
|---|---|---|---|---|---|---|---|---|
| 0 | Data[7:0] | | | | | | | |
| 1 | Data[15:8] | | | | | | | |
| 2 | Data[23:16] | | | | | | | |
| 3 | Data[31:24] | | | | | | | |
| 4 | Data[39:32] | | | | | | | |
| 5 | Data[47:40] | | | | | | | |
| 6 | Data[55:48] | | | | | | | |
| 7 | Data[63:56] | | | | | | | |

FIG. 4B

| Bit Time | 7 | 6 | 5 | 4 | 3 | 2 | 1 | 0 |
|---|---|---|---|---|---|---|---|---|
| 0 | Mask[7:0] | | | | | | | |
| 1 | Mask[15:8] | | | | | | | |
| 2 | Mask[23:16] | | | | | | | |
| 3 | Mask[31:24] | | | | | | | |
| 4 | Data[7:0] | | | | | | | |
| 5 | Data[15:8] | | | | | | | |
| 6 | Data[23:16] | | | | | | | |
| 7 | Data[31:24] | | | | | | | |
| 8+ | Packet may contain up to eight double words of data | | | | | | | |

| CMD Code | Command | Packet Type |
| --- | --- | --- |
| 000000 | Nop | Info |
| 000001 | VicBlk | Request / Address / Data |
| 000010 | Reserved | – |
| 000011 | ValidateBlk | Request / Address |
| 000100 | RdBlk | Request / Address |
| 000101 | RdBlkS | Request / Address |
| 000110 | RdBlkMod | Request / Address |
| 000111 | ChangeToDirty | Request / Address |
| x01xxx | Write(Sized) | Request / Address / Data |
| 01xxxx | Read(Sized) | Request / Address |
| 100xxx | Reserved | – |
| 110000 | RdResponse | Response / Data |
| 110001 | ProbeResp | Response |
| 110010 | TgtStart | Response |
| 110011 | TgtDone | Response |
| 110100 | SrcDone | Response |
| 110101 | MemCancel | Response |
| 11011x | Reserved | – |
| 11100x | Probe | Request / Address |
| 11101x | Broadcast | Request / Address |
| 11110x | Reserved | – |
| 111110 | Reserved | – |
| 111111 | Sync | Info |

FIG. 6

| Bit Time | 7 | 6 | 5 | 4 | 3 | 2 | 1 | 0 |
|---|---|---|---|---|---|---|---|---|
| 0 | SrcUnit[1:0] | | CMD[5:0] | | | | | |
| 1 | DestNode[2:0] | | | DestUnit[1:0] | | SrcNode[2:0] | | |
| 2 | Mask/Count[1:0] | | Compat | SrcTag[4:0] | | | | |
| 3 | Addr[7:2] | | | | | | Lock | Mask/Count[3:2] |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | SrcUnit[1:0] | | CMD[5:0] | | | | | |
| 1 | TgtNode[2:0] | | | TgtUnit[1:0] | | SrcNode[2:0] | | |
| 2 | Rsv | | | SrcTag[4:0] | | | | |
| 3 | Addr[7:2] | | | | | | Reserved | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | SrcUnit[1:0] | | CMD[5:0] | | | | | |
| 1 | DestNode[2:0] | | | DestUnit[1:0] | | SrcNode[2:0] | | |
| 2 | Reserved | | Error | SrcTag[4:0] | | | | |
| 3 | Shared | Reserved | | | | | | |

| Bit Time | 7 | 6 | 5 | 4 | 3 | 2 | 1 | 0 |
|---|---|---|---|---|---|---|---|---|
| 0 | SrcUnit[1:0] | | CMD[5:0] | | | | | |
| 1 | DestNode[2:0] | | | DestUnit[1:0] | | SrcNode[2:0] | | |
| 2 | Reserved | | Error | SrcTag[4:0] | | | | |
| 3 | Reserved | | | | | | | |

IMPLEMENTING LOCKS IN A DISTRIBUTED PROCESSING SYSTEM

BACKGROUND OF THE INVENTION

1. Field of the Invention

The present invention broadly relates to computer systems. More particularly, the present invention relates to a messaging scheme to synchronize processes within a multiprocessing computing environment.

2. Description of the Related Art

Generally, personal computers (PCs) and other types of computer systems have been designed around a shared bus system for accessing a shared memory. One or more processors and one or more input/output (I/O) devices are coupled to the shared memory through the shared bus. The I/O devices may be coupled to the shared bus through an I/O bridge, which manages the transfer of information between the shared bus and the I/O devices. The processors are typically coupled to the shared bus either directly or through a cache hierarchy.

FIG. 1A illustrates a shared bus multiprocessor computer system 10 of the prior art. Three processors, 14A through 14C, are shown directly connected to the shared system bus 18. More processors may also be connected in similar fashion. The system memory 16 (i.e., the shared memory) is shown connected to the system bus 18. Each processor, 14A through 14C, may further have its own local cache, caches 12A through 12C respectively. As used herein, the term "task" refers to a sequence of instructions arranged to perform a particular operation. Application software being executed in the multiprocessing computer system 10 and the operating system for the computer system 10 may each comprise one or more tasks.

One problem that confronts a shared-memory multiprocessor is the ability to coordinate or synchronize processors that are working on a common task. Particularly, access to critical regions of memory 16 accessed by two or more processes must be controlled to provide consistent results in memory transactions. A critical region or a critical section of the memory 16 may contain global variables accessible by each processor in the system. Typically, the critical regions are protected by lock variables (or "semaphores") to synchronize the processes using an atomic swap operation. In an atomic swap operation, a processor can both read a memory location and set it to the locked value in the same bus operation, preventing any other processor from reading or writing the shared system memory 16.

FIG. 1B illustrates a simplified flow diagram for locking one or more critical regions using an atomic swap instruction. In a shared bus system, e.g., the system in FIG. 1A, bus arbitration is relatively simple because the shared bus 18 is the only path to the system memory 16. Therefore, the processor that gets the bus may retain control of the bus, thereby locking out all other processors from the memory. When a processor wants to establish a lock, it first reads the lock variable to test its state. The processor keeps reading and testing until the value indicates that the lock is unlocked.

After detecting the state of the lock variable as unlocked, the processor that wishes to lock the variable attempts to do so by executing an appropriate instruction over the shared system bus 18. The instruction may be known as a "test-and-set" instruction in some instruction sets. A test-and-set instruction has the typical form of read-modify-write, in which the entire process is not interruptible by another processor attempting to read or write to the affected memory location. That is, once the test-and-set instruction is initiated and the Read access is completed, no other access can be made to the affected memory location until the location is rewritten during the second step (i.e., the "set" function) of the test-and-set instruction.

In an x86 architecture, a processor may lock the shared system bus 18 using the LOCK prefix in front of an instruction. When an instruction with a LOCK prefix executes, the processor will assert its bus lock signal output. This signal may be connected to an external bus controller (not shown), which then prevents any other processor from taking over the system bus. Thus, a number of shared system resources, e.g., the system memory 16, a disk drive (not shown), etc. may be dedicated to a single processor during execution of the operation affecting the shared system resource.

Generally, the skeleton for a program to update a critical region may be given as: LOCK (critical_region); Access (critical_region); UNLOCK(critical_region). A flag or a semaphore may be associated with the critical region. As mentioned earlier, the critical region may typically include memory locations containing shared data, data structure or lock variables. The LOCK and UNLOCK statements operate on the semaphore of the critical region rather than on the content of the critical region. The semaphore permits no more than one process at a time to have access to the critical region. If process A executes the LOCK statement successfully, then all other processes (that require accesses to shared system resources) within the computer system 10 must be halted until process A executes the UNLOCK statement. The LOCK statement can be implemented in part with a test-and-set instruction.

The synchronization of accesses to shared system resources is accomplished by serializing concurrent executions of LOCK instructions by more than one process. Due to the serial execution of LOCK, no more than one process may observe a zero value (the reset condition) of the semaphore and thereby move past the LOCK to the update stage. Thus, as shown in FIG. 1B, the requesting processor may continue its attempts to lock the variable so long as the semaphore is set (by another processor). When one process passes the LOCK and reaches the UNLOCK, the semaphore can be returned to a 0 state (i.e., the reset condition) and thereby permit another process (which may be executed on another processor) to pass the LOCK statement and update the shared variable.

Once a process (through the corresponding processor) successfully establishes the lock, i.e., succeeds in locking the critical region, that process then operates on the critical region. Upon completion of operation on the critical region, the process unlocks the critical region, for example, by resetting the associated semaphores. This allows the next process to establish lock ownership and similarly continue lock operations over the lock variables.

Unfortunately, shared bus systems suffer from several drawbacks. For example, since multiple devices are attached to the shared bus, the bus is typically operated at a relatively low frequency. Further, a shared system bus may not be scaled to include a large number of devices because of the fixed bus bandwidth. Once the bandwidth requirements of the devices attached to the shared bus (either directly or indirectly) exceeds the available bandwidth of the shared bus, devices will frequently be stalled when attempting to access the bus. This results in overall decrease in the system performance.

One or more of the above problems may be addressed using a distributed memory system. In a distributed memory multiprocessing computer system, the shared physical system memory 16 (FIG. 1A) of the prior art may instead be distributed among the processing nodes. Further, the dedicated system bus 18 (FIG. 1A) of prior art may be absent in such a multiprocessing environment. Therefore, it is desirable to provide a mechanism to determine which process receives the lock so as to synchronize processes within the system without restricting the scalability of the system.

SUMMARY OF THE INVENTION

The problems outlined above are in large part solved by a multiprocessing computer system as described herein. The computer system may employ a distributed system memory and may further include multiple processing nodes. Two or more of the processing nodes may be coupled to separate memories that may form a distributed memory system. The processing nodes may be interconnected using any suitable interconnect. The memory address space is assigned across the memories associated with each node.

In one embodiment, acquisition and release of a lock is arbitrated by a single processing node from the plurality of processing nodes in the multiprocessing system. A first processing node transmits a lock request to a second processing node, which arbitrates such lock requests from each processing node within the system. The second processing node, in turn, determines whether the received lock request is ready for service and, if so, issues a broadcast message to all the remaining processing nodes within the system. The broadcast message thus serves to inform each remaining processing node of the decision by the second processing node to place the lock request from the first processing node into service.

In response to the broadcast message, each remaining processing node sends a probe response message to the second processing node (i.e., the arbitrating node) when ready to free all the shared system resources for access by the lock requesting node, i.e., the first processing node. The second processing node, in turn, informs the first processing node of availability of lock ownership by transmitting a target done message to the first processing node.

After completion of lock operations, the first processing node transmits a lock release request to the second processing node. The second processing node again sends a broadcast message to each remaining processing node in the system to inform them of the completion of current lock operations. Each remaining processing node responds to the broadcast message by transmitting a corresponding probe response message to the second processing node as an acknowledgment of the receipt of the broadcast message. The protocol is completed when the second processing node sends a target done message to the first processing node after receiving all probe response messages from other processing nodes in the system. The messaging scheme according to present invention allows for contention and deadlock-free locking within the distributed memory multiprocessing computer system.

BRIEF DESCRIPTION OF THE DRAWINGS

A better understanding of the present invention can be obtained when the following detailed description of the preferred embodiment is considered in conjunction with the following drawings, in which:

FIG. 3A is a block diagram of an exemplary embodiment of an information packet;

FIG. 3B is a block diagram of an exemplary embodiment of a request packet;

FIG. 4A is a block diagram of an exemplary embodiment of a response packet;

FIG. 4B is a block diagram of an exemplary embodiment of a data packet;

FIG. 5 is a block diagram of an exemplary embodiment of a data packet in a sized byte write operation;

FIG. 6 is a table illustrating exemplary packet types that may be employed in the computer system of FIG. 2A;

FIG. 8A is a block diagram of an exemplary sized write request packet;

FIG. 8B is a block diagram of an exemplary broadcast packet; and

FIG. 8C is a block diagram of an exemplary probe response packet; and

FIG. 8D is a block diagram of an exemplary target done packet.

DETAILED DESCRIPTION OF SPECIFIC EMBODIMENTS

Overview

Figure 1A:
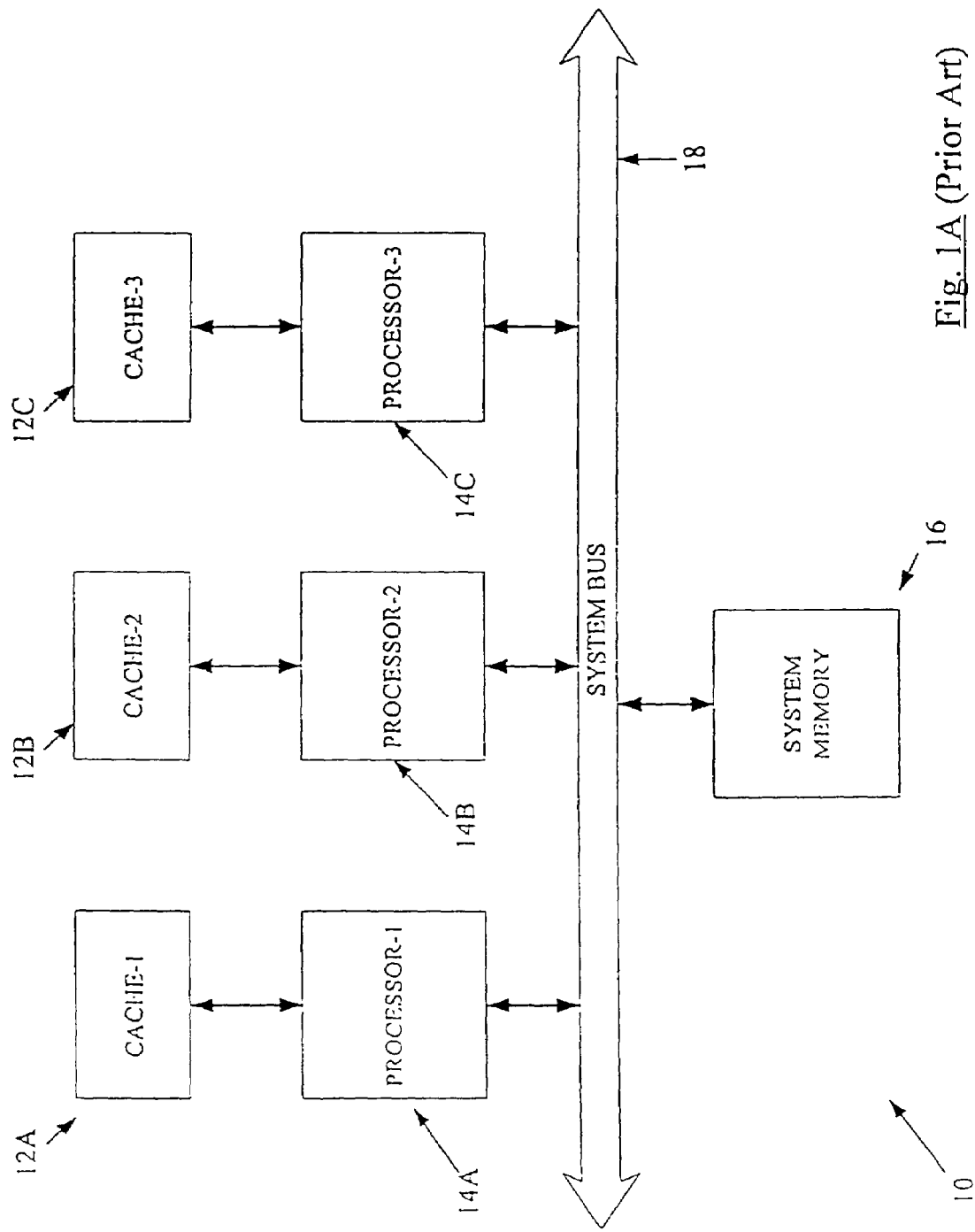
FIG. 1A illustrates diagrammatically a prior art multiprocessing computer system configuration.
Figure 1B:
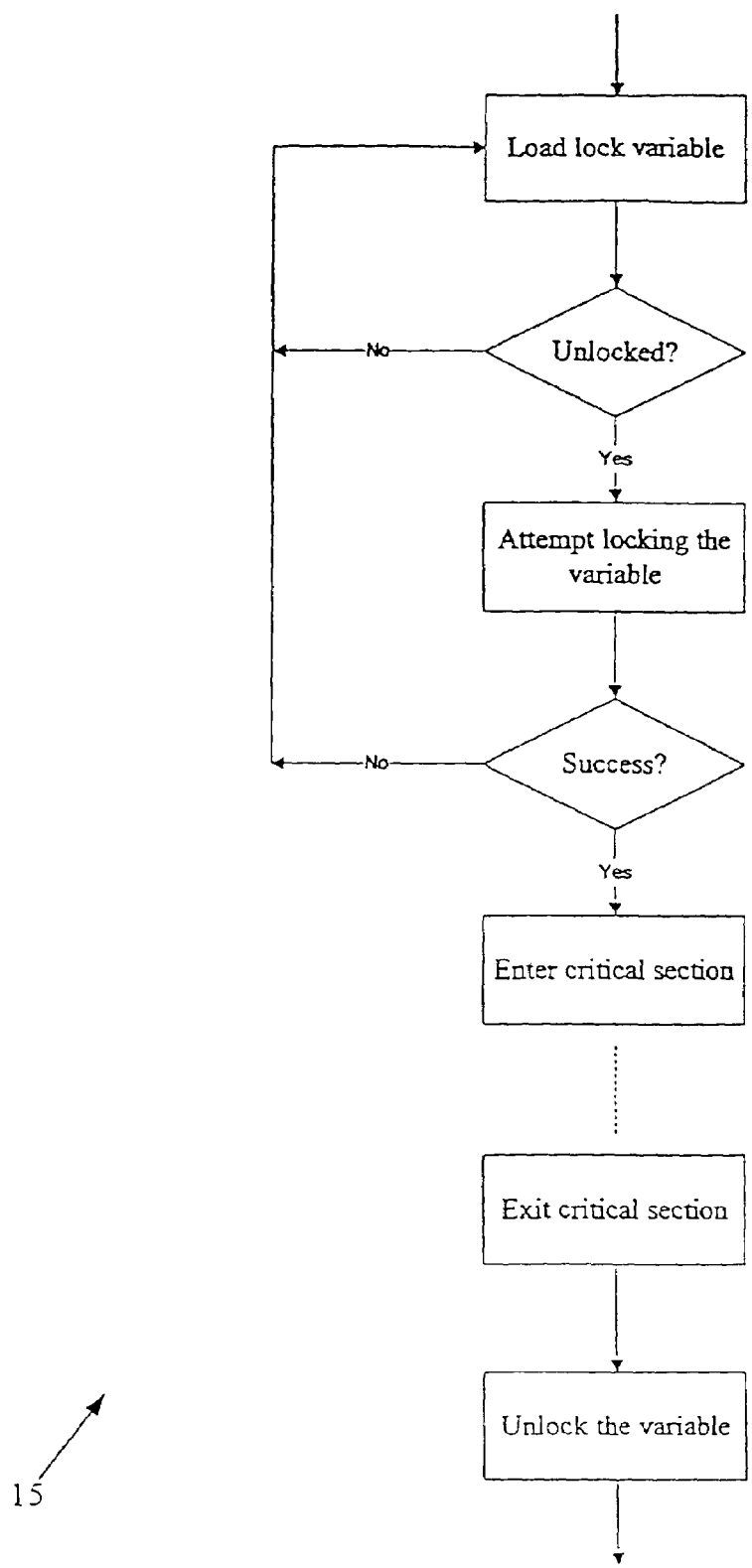
FIG. 1B is a flowchart depiction of a prior art method to perform lock operations within the computer system configuration of FIG. 1A.
Figure 2A:
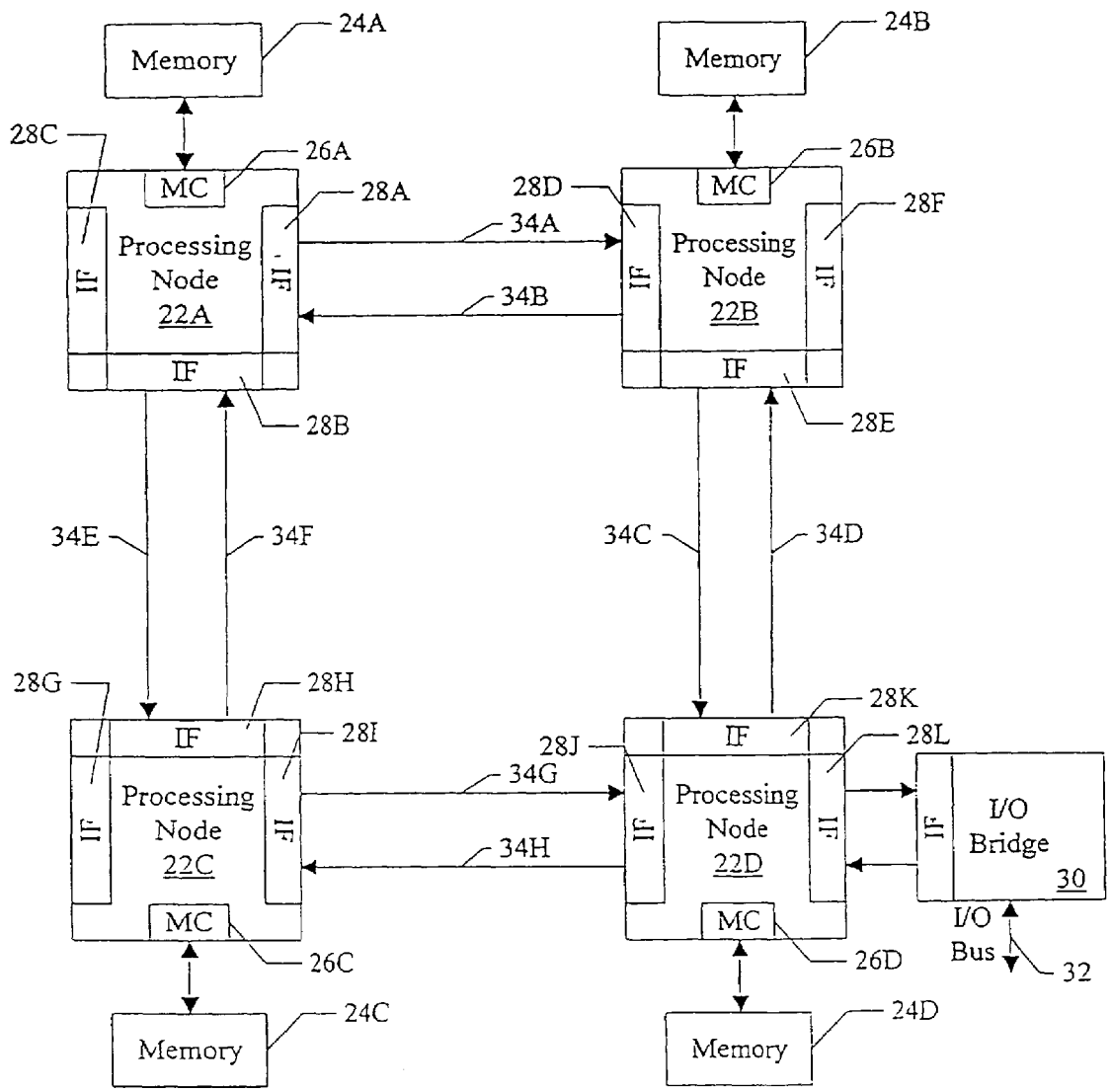
FIG. 2A is a block diagram of an embodiment of a distributed memory multiprocessing computer system.

Turning now to FIG. 2A, one embodiment of a distributed memory multiprocessing computer system 20 is shown. In the embodiment of FIG. 2A, computer system 20 includes several processing nodes 22A, 22B, 22C, and 22D. Each processing node is coupled to a respective portion of system memory 24A-24D via a memory controller 26A-26D included within each respective processing node 22A-22D. Thus, the distributed memories 24A-24D comprise the total system memory.

Additionally, processing nodes 22A-22D include one or more interface ports 28, also known as interface logic, to communicate among the processing nodes 22A-22D, and to also communicate between a processing node and a corresponding I/O bridge. For example, processing node 22A includes interface logic 28A for communicating with processing node 22B, interface logic 28B for communicating with processing node 22C, and a third interface logic 28C for communicating with yet another processing node (not shown) or an I/O bridge (not shown). Similarly, processing node 22B includes interface logic 28D, 28E, and 28F; processing node 22C includes interface logic 28G, 28H, and 28I; and processing node 22D includes interface logic 28J, 28K, and 28L. Processing node 22D is coupled to communicate with an I/O bridge 30 via interface logic 28L. Other processing nodes may communicate with other I/O bridges in a similar fashion. I/O bridge 30 is coupled to an I/O bus 32.

The interface structure that interconnects processing nodes 22A-22D includes a set of dual-unidirectional links. Each dual-unidirectional link is implemented as a pair of packet-based unidirectional links to accomplish high-speed packetized information transfer between any two processing nodes in the computer system 20. One example of a dual-unidirectional link structure is links 34A and 34B. The unidirectional lines 34A are used to transmit packets from processing node 22A to processing node 22B and lines 34B are used to transmit packets from processing node 22B to processing node 22A. Other sets of lines 34C-34H are used to transmit packets between their corresponding processing nodes as illustrated in FIG. 2A.

A similar dual-unidirectional link structure may be used to interconnect a processing node and its corresponding I/O device, or a graphic device or an I/O bridge as is shown with respect to the processing node 22D. A dual-unidirectional link may be operated in a cache-coherent fashion for communication between processing nodes or in a non-coherent fashion for communication between a processing node and an external I/O or graphic device or an I/O bridge. It is noted that a packet to be transmitted from one processing node to another may pass through one or more remaining nodes. For example, a packet transmitted by processing node 22A to processing node 22D may pass through either processing node 22B or processing node 22C in the arrangement of FIG. 2A. Any suitable routing algorithm may be used. Other embodiments of computer system 20 may include more or fewer processing nodes than those shown in FIG. 2A.

Processing nodes 22A-22D, in addition to a memory controller and interface logic, may include other circuit elements or logical entities, such as one or more processor cores, a cache memory (internal or external), a bus bridge, a graphics logic, a bus controller, a peripheral device controller, etc. In an exemplary embodiment, such circuit elements or logical entities are termed "units" or "functions" of the node that may act as a source or a destination of packet transactions. Further, each circuit element in a processing node may be coupled to one or more interface ports depending on the functionality being performed by the processing node. For example, some circuit elements may only couple to the interface logic that connects an I/O bridge to the processing node, other circuit elements may only couple to the interface logic that connects two processing nodes, etc. Other combinations may be easily implemented as desired.

Memories 24A-24D may comprise any suitable memory devices. For example, a memory 24A-24D may comprise one or more RAMBUS DRAMs (RDRAMs), synchronous DRAMs (SDRAMs), static RAM, etc. The memory address space of the computer system 20 is divided among memories 24A-24D. Each processing node 22A-22D may include a memory map used to determine which addresses are mapped to which memories 24A-24D, and hence to which processing node 22A-22D a memory request for a particular address should be routed. In one embodiment, the coherency point for an address within computer system 20 is the memory controller 26A-26D coupled to the memory that is storing the bytes corresponding to the address. In other words, the memory controller 26A-26D is responsible for ensuring that each memory access to the corresponding memory 24A-24D occurs in a cache-coherent fashion. Memory controllers 26A-26D may comprise control circuitry for interfacing to memories 24A-24D. Additionally, memory controllers 26A-26D may include request queues for queuing memory requests.

Generally, interface logic 28A-28L may comprise a variety of buffers for receiving packets from one unidirectional link and for buffering packets to be transmitted upon another unidirectional link. Computer system 20 may employ any suitable flow control mechanism for transmitting packets. For example, in one embodiment, each transmitting interface logic 28 stores a count of the number of each type of buffer within the receiving interface logic at the other end of the link to which the transmitting interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 2B:
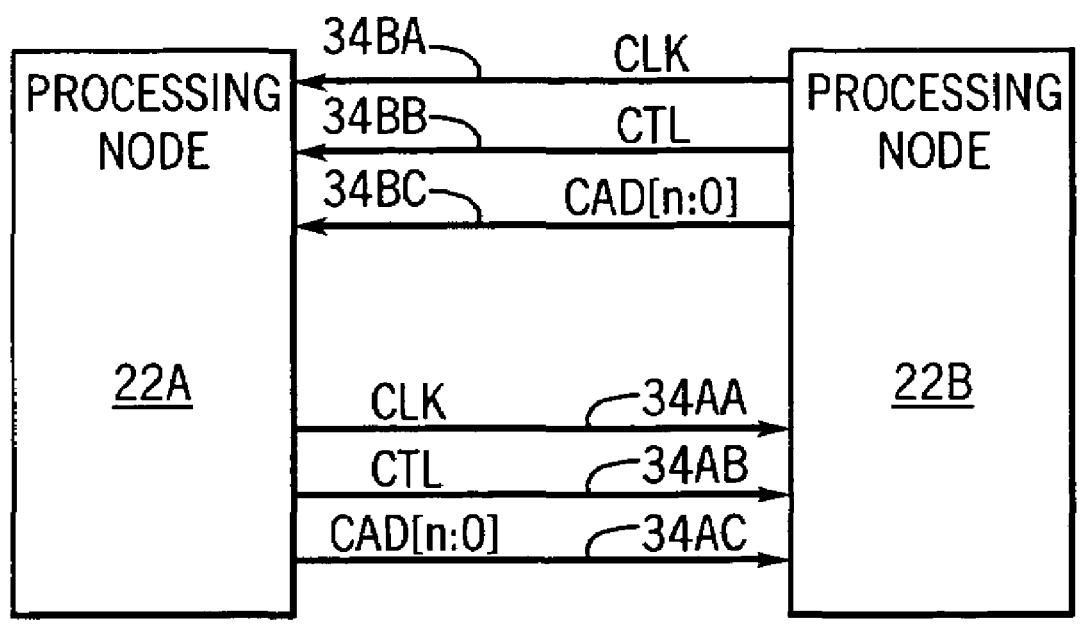
FIG. 2B is a diagrammatical illustration of an exemplary embodiment of the interconnect structure between a pair of processing nodes of the distributed multiprocessing computer system of FIG. 2A.

Turning next to FIG. 2B, a block diagram illustrating processing nodes 22A and 22B is shown to illustrate in more detail one embodiment of the dual unidirectional link structure connecting the processing nodes 22A and 22B. In the embodiment of FIG. 2B, lines 34A (the unidirectional link 34A) include a clock line 34AA, a control line 34AB, and a command/address/data bus 34AC. Similarly, lines 34B (the unidirectional link 34B) include a clock line 34BA, a control line 34BB, and a command/address/data bus 34BC.

A clock line transmits a clock signal that indicates a sample point for its corresponding control line and the command/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the command/address/data bus. For example, four clock lines may be used for a 32-bit command/address/data bus (i.e., one clock line used for every eight CAD bits).

The control line indicates whether the data transmitted upon the command/address/data bus is a bit time of control information or a bit time of data. The control line is asserted to indicate control information, and deasserted to indicate data. Certain control information indicates that data follows. The data may immediately follow the corresponding control information. In one embodiment, other control information may interrupt the transmission of data. Such an interruption may be performed by asserting the control line for a number of bit times during transmission of the data and transmitting the bit times of the control information while the control line is asserted. Control information that interrupts data may not indicate that associated data will be following.

The command/address/data bus comprises a set of lines for transmitting the data, command, and address bits. In one embodiment, the command/address/data bus may comprise 8, 16, or 32 lines. Each processing node or I/O bridge may employ any one of the supported numbers of lines according to design choice. Other embodiments may support other sizes of command/address/data bus as desired.

According to one embodiment, the command/address/data bus lines and the clock line may carry inverted data (i.e., a logical "1" is represented as a low voltage on the line, and a logical "0" is represented as a high voltage). Alternatively, these lines may carry non-inverted data (i.e., a logical "1" is represented as a high voltage on the line, and logical "0" is represented as a low voltage). As a further alternative, differential signaling may be implemented.

Turning now to FIGS. 3A-5, exemplary packets employed in a cache-coherent communication (i.e., the communication between processing nodes and over the coherent links 34A-34H) according to one embodiment of computer system 20 are shown. Other coherent link packets (e.g., FIGS. 8A-8D) are described later.

FIGS. 3A, 3B and 4A illustrate information, request, and response packets, respectively, and FIGS. 4B and 5 illustrate data packets. Other embodiments may employ different packet definitions. Each packet is illustrated as a series of bit times enumerated under the "bit time" heading. The bit times of the packet are transmitted according to the bit time order listed. FIGS. 3A-5 illustrate packets for an eight-bit command/address/data bus implementation. Accordingly, eight bits (numbered seven through zero) of control or data information is transferred over the eight-bit command/address/data bus during each bit time. Bits for which no value is provided in the figures may either be reserved for a given packet, or may be used to transmit packet-specific information. In one embodiment, each control packet consists of four or eight bytes.

FIG. 3A illustrates an information packet (info packet) 38. Info packet 38 comprises four bit times on an eight-bit link. The command encoding is transmitted during bit time 0, and comprises six bits—denoted by the command field CMD[5:0]—in the present embodiment. An exemplary command field encoding is shown in FIG. 6. Each of the other packets shown in FIGS. 3B and 4A also includes the command encoding in the same bit positions during bit time 0. Info packet 38 may be used for nearest neighbor communication between processing nodes and, thus, may exist below the level of the logical (i.e., fabric-level or chain-level) protocol. Additionally, the info packets are not routed within the fabric, and, hence, may not require any buffering in the receiver nodes. In one embodiment, the messaging protocol may require that info packets are not flow controlled and should always be accepted at their destination nodes. The remaining fields in the info packet 38 may be command-specific, as illustrated in FIG. 3A. Exemplary info packets include a system synchronization (or Sync) packet or a no-operation (NOP) packet, as illustrated in the table of FIG. 6. In one embodiment, Sync packets are used to indicate that a resynchronization event, such as a system reset or a system-wide error, has occurred in the computer system 20.

As mentioned earlier, the messaging scheme within the multiprocessing system 20 may be considered "coupon-based" to indicate availability of buffers for packets flowing between a transmitting and a receiving node. In an implementation of such a coupon-based scheme, a transmitting node may contain a counter for each type of buffer at the receiving node. At system reset, the transmitting node may clear its counters; and when the reset signal is deasserted, the receiving node may send an information packet (with a format similar to that shown in FIG. 3A, with the CMD field identifying an NOP command) to the transmitting node to indicate how many buffers of each type it has available. When the transmitting node sends a request or response packet to the receiving node, the transmitting node decrements the associated counter. When a particular counter reaches a zero value, the transmitting node stops sending packets to the associated buffer. In an exemplary embodiment, the information packet includes a plurality of two-bit fields, each of which corresponds to a particular type of buffer. When the receiving node frees a buffer, it sends another information packet to the transmitting node, with each two-bit field indicating how may buffers of each type have become available. The transmitting node then increments the associated counters in accordance with the data in the information packet.

FIG. 3B shows an example of a request packet 40. As mentioned earlier, each unidirectional link is a pipelined, split-transaction interconnect in which transactions are tagged by the source node and responses can return to the source node out of order depending on the routing of packets at any given instance. A source node sends a request packet to initiate a transaction. The command-specific fields within the request packet 40 are described later with reference to specific requests. Generally, each request packet may include a CMD field (which has been described earlier) and an Addr field. The request packet 40 may comprise eight bit times on an eight-bit link if the command in the request packet has an associated address. In the absence of an associated address, the request packet 40 may be only four bytes long.

The command encoding (i.e., CMD[5:0]) is transmitted during bit time 0. Bit times 4 through 7 are used to transmit an address associated with the request. The source of the request packet is identified in bit times 0 and 1 by a three-bit SrcNode [2:0] field and an associated two-bit SrcUnit[1:0] field. In one embodiment, a maximum of 32 ($2^5$) sources of a request packet may simultaneously transmit into the system 20 because of the combined five-bit SrcNode and SrcUnit fields, although only one transaction per source at a given time may be allowed. In an alternative embodiment, one or more sources may have more than one transaction active in the system at a given time.

FIG. 4A illustrates a response packet 42. Response packet 42 includes the command encoding (the CMD field), the destination of the packet (the DestNode and the DestUnit fields), and other command-specific fields described later. The three-bit DestNode field and two-bit DestUnit field identifies the processing node and unit within the processing node for which the response packet is destined. Various types of response packets may include additional information. For example, a read response packet may indicate the amount of read data provided in a following data packet. Generally, a response packet 42 may be used for commands that do not require transmission of the address while carrying out the transaction. Furthermore, response packet 42 (e.g., the probe response packet described later with reference to FIG. 8C) may be used to transmit a positive acknowledgement packet to terminate a transaction.

FIG. 4B illustrates an exemplary data packet 46 having eight bit times on an eight-bit link. It should be understood, however, that a data packet may be any multiple of 4 bit times up to 64 (i.e., 16 doublewords). Data packets contain the data payload for various transactions. Generally, a data packet may follow a write request or a read response packet, and the data bytes may be transferred in an ascending address order. Data packet 46 may comprise 4 to 64 bytes. In one embodiment, the length of the data packet 46 is a multiple of four bytes. In the case of a 64-byte cache block, the data packet 46 would take 64 bit times (on an eight-bit link) to complete the cache block transfer. Other embodiments may define a cache block to be of a different size, as desired. Additionally, data may be transmitted in less than a cache block size for non-cacheable reads and writes. Data packets for transmitting data less than cache block size require fewer bit times. In one embodiment, data bytes are aligned at a doubleword (four bytes) boundary. Therefore, within a doubleword, data bytes appear in their natural byte lanes. For transfers of less than a full doubleword, the data may be padded with undefined bytes to achieve this byte lane alignment at the doubleword boundary.

Referring now to FIG. 5, one example of a data packet 50 corresponding to a sized write request is shown. A Write (Sized) request transfers data for non-cacheable writes or other writes that require data less than a cache block in size. In a preferred embodiment, the size of a cache block is 64 bytes. The data packet for a sized write operation may be arranged with the lowest addressed doubleword sent first and the remainder of the addressed data sent in ascending address order in a multiple of a doubleword. Thus, the data packet 50 for a sized write operation may contain anywhere from one to sixteen doublewords (i.e., from four bytes to sixty-four bytes) in ascending address order.

In one embodiment, the data packet corresponding to a sized write request packet may transmit one doubleword (i.e., four bytes) of masks first, regardless of the amount of data in the data packet 50. The Masks are denoted by the Mask field in FIG. 5. Each bit of a Mask field corresponds to a byte of data. For example, Mask[0] corresponds to Data [7:0], Mask [1] corresponds to Data[15:8], and so on. Therefore, up to eight doublewords of data may correspond to the 32 Mask bits. For data lengths more than eight doublewords but less than sixteen doublewords (i.e., a cache block size), a second sized write request packet and another data packet 50 with 32 Mask bits, but less than 32 bytes of data, may be transmitted. All-zero byte masks are permitted; however, if any byte masks are non-zero, at least one set mask bit must be associated with the first doubleword of data.

FIGS. 3A-5 illustrate packets for an eight-bit link. Packets for 16- and 32-bit links may be formed by concatenating consecutive bit times illustrated in FIGS. 3A-5. For example, bit time 1 of a packet on a 16-bit link may comprise the information transmitted during bit times 1 and 2 on the eight-bit link. Similarly, bit time 1 of the packet on a 32-bit link may comprise the information transmitted during bit times 1 through 4 on the eight-bit link. Formulas 1 and 2 below illustrate the formation of bit time 1 of a 16-bit link and bit time 1 of a 32-bit link in terms of bit times for an eight-bit link.

$$BT1_{16}[15:0]=BT2_8[7:0]\|BT1_8[7:0] \tag{1}$$

$$BT1_{32}[31:0]=BT4_8[7:0]\|BT3_8[7:0]\|BT2_8[7:0]\|BT1_8[7:0] \tag{2}$$

Turning now to FIG. 6, a table 60 is shown illustrating commands employed for an exemplary embodiment of the dual-unidirectional link structure within computer system 20. Table 60 includes a command code column illustrating the command encodings (the CMD field) assigned to each command, a command column including a mnemonic representing the command, and a packet type column indicating which of the packets 38-50 (FIGS. 3A-5) is used for that command. A brief functional explanation for some of the commands in FIG. 6 is given below.

A read transaction is initiated using one of the Read(Sized) (also referred to as Rd(sized)), RdBlk (read block), RdBlkS (read block shared) or RdBlkMod (read block modify) requests. The sized read request, Read(Sized), is used for non-cacheable reads or reads of data other than a cache block in size. The amount of data to be read is encoded into the Read(Sized) request packet. For reads of a cache block, the RdBlk request may be used unless: (i) a writeable copy of the cache block is desired, in which case the RdBlkMod request may be used; or (ii) a copy of the cache block is desired but no intention to modify the block is known. The RdBlkS request may be used to make certain types of coherency schemes (e.g. directory based coherency schemes) more efficient. In response to the RdBlkS request, the target node may return the cache block to the source node in a shared state. In general, the appropriate read request is transmitted from the source node initiating a read transaction to a target node that owns the memory corresponding to the cache block requested by the source node.

The ChangeToDirty request packet may be transmitted by a source node to obtain write permission for a cache block that is stored in the source node in a non-writeable or read-only state. A transaction initiated with a ChangeToDirty request may operate similar to a read transaction except that the target node does not return data. The ValidateBlk (validate block) request may be used to obtain write permission to a cache block not stored in the source node if the source node intends to update the entire cache block. No data is transferred to the source node for such a transaction, which otherwise operates similar to a read transaction. Preferably, the ValidateBik and the ChangeToDirty requests may only be directed to a memory, and may only be generated by coherent nodes.

Locks

Figure 7A:
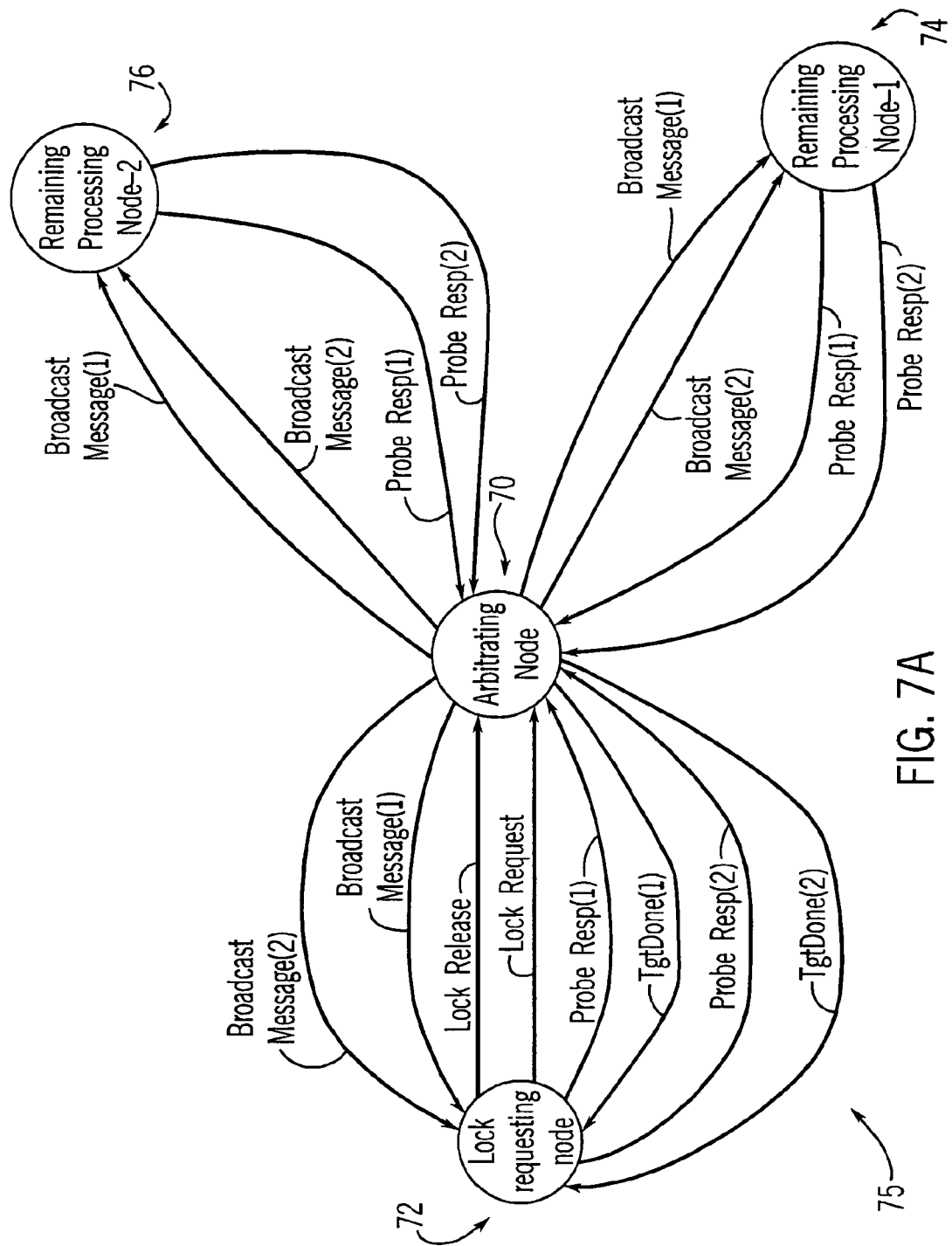
FIG. 7A is a diagram illustrating an example flow of packets during a lock transaction within the computer system of FIG. 2A.

FIG. 7A depicts an exemplary flow of packets during a lock transaction in the computer system 20. The lock requesting node is indicated by the numeral 72, the arbitrating node by the numeral 70, and the remaining processing nodes by the numerals 74 and 76. It is noted that any processing node 22A-22D may be a lock requesting node. Only one of the processing nodes may function as an arbitrating node. Here, node 22D is selected as an arbitrating node for illustrative purposes only. The system designer may select any other processing node as an arbitrating node by having necessary hardware built into it. Any node that is neither an arbitrating node nor a lock requesting node is referred to as a remaining node. Further, the same node may function as both the arbitrating node and a lock requesting node. In such event, many of the external packets may not be needed as the arbitrating node is the same as the lock requesting node.

As mentioned earlier, any processing node in FIG. 2A may function as a lock requesting node, an arbitrating node or a remaining node depending on the particular transaction. The arrangement shown in FIG. 7A is for illustrative purpose only and does not imply similar actual physical connections among the processing nodes 22A-22D. That is, the remaining node, e.g. node 76, and the lock requesting node 72 may not be directly physically connected to the arbitrating node 70. Hence, additional packet routing may occur among them. Further, the arrangement of FIG. 7A is described with reference to the circuit topology in FIG. 2A. It is understood that other interconnections between two or more processing nodes may be contemplated and the packet transfer scheme of FIG. 7A may be easily implemented in those various interconnections. The arrows are used to indicate dependencies and represent packets that must be sent between respective nodes joined by the arrows.

Referring now to FIG. 7A, an example flow of packets 75 for lock acquisition and lock release operations within the multiprocessing system in FIG. 2A is illustrated. Each processing node includes built-in hardware to generate appropriate packets illustrated in FIG. 7A. As mentioned earlier, any processing node may function as a lock requesting node as well as a remaining node. However, only one processing node may arbitrate lock requests within the system to provide a single serialization point for lock requests. This arrangement allows for proper synchronization of lock operations within the distributed memory architecture of FIG. 2A.

A lock transaction has three parts: lock acquisition, execution of actual lock operations, and lock release. Lock acquisition and release are serialized through a dedicated processing node (i.e., the arbitrating node). In the embodiment of FIG. 2A, the processing node 22D is assumed to include appropriate built-in hardware to function as an arbitrating node. Once the lock has been established, the lock operations may proceed just as they normally would. In other words, when a lock is established, the lock requesting node may access any of the system resources atomically. When a node 72 detects that it needs to lock the system resources, it generates a lock request message to the arbitrating node 70. In one embodiment, the lock request message may be a zero-length Write(sized) request packet having an address in a predetermined reserved lock request address range. Other embodiments may employ other types of messaging formats to transmit lock request messages (e.g., a request packet having a dedicated lock request command encoding, etc.).

Each processing node within the system 20 may generate a corresponding lock request. The arbitrating node 70 may queue each received lock request in a chronological order so as to guarantee eventual service of that lock request. A FIFO (first-in-first-out) buffer may be provided in the arbitrating node to store pending lock requests. When a lock request is ready for service, i.e., when that lock request becomes the least recently received pending lock request (in the chronological hierarchy queue), the arbitrating node 70 transmits a broadcast packet 82 (FIG. 8B) to every other processing node in the system—including the lock requesting node 72. This is indicated by the directed arrow marked 'Broadcast Message (1)' in FIG. 7A.

The broadcast message serves to inform each recipient processing node of the decision by the arbitrating node 70 to place the corresponding lock request into service. In response to the broadcast message, each recipient processing node (excluding the lock requesting node 72) ceases issuing new requests. However, the recipient processing nodes may continue to forward requests, issue probes and responses, and generate packets for the purpose of flow control. The arbitrating processing node 70 also operates similarly in response to the broadcast message. Further, each of the remaining processing nodes 74 and 76 and the arbitrating node 70 provide sufficient internal resources for any pending requests or responses arriving from other processing nodes within the system. This safeguard accounts for the different ways a packet may be routed within the system 20. For example, two packets from the source processing node to an identical target processing node may take different times to reach the target node.

When nodes 74 and 76 have completed the above activities, they send corresponding probe responses to the arbitrating node 70 indicating completion. The lock requesting node 72 also sends, as part of the messaging protocol, a probe response to the arbitrating node 70 in response to the broadcast message. This message transmission is illustrated by the directed arrows marked 'ProbeResp(1).' The arbitrating node 70 grants lock ownership to the lock requesting node 72 after receiving all ProbeResp(1) responses. In the preferred embodiment, the arbitrating node 70 transmits a target done response (TgtDone(1) in FIG. 7A) to the lock requesting node to inform the lock requesting node of its ownership of system resources, and thereby to allow it to complete lock operations atomically without causing any deadlock.

In the above messaging scheme, it may be possible that a processing node (other than the lock requesting node) transmits a lock request after the arbitrating node sends the broadcast message, but before that processing node sends its corresponding target done response. All such intermediate lock requests may be queued by the arbitrating node for later service, as discussed before. The arbitrating node 70 thus manages lock request arbitration without any resource contentions or deadlocks among the processing nodes. The present messaging scheme of granting lock ownership takes into account the distributed memory nature of the multiprocessing system 20 and the non-uniform routing of binary packets among the processing nodes.

Upon acquiring lock ownership, the lock requesting node 72 may proceed with the operation(s) which caused the node 72 to establish the lock. In one embodiment, when the locked sequence is executed, the lock requesting node transmits a lock release request to the arbitrating node to inform the arbitrating node of the completion of lock operations. In an alternative embodiment, the lock requesting node sets the appropriate semaphore for the critical region during lock acquisition process, and then releases one or more shared system resources (e.g., memory controllers) that were locked during the lock acquisition process. This allows other processing nodes to continue routine processing operations except for the processing involving the critical region. After executing the locked sequence, the lock requesting node resets the semaphore so as to allow a pending lock request to be placed into service by the arbitrating node.

In one embodiment, the lock release request has the form similar to the Write(sized) packet 80 (for the lock request message) discussed later. That is, the lock release request may be a zero-length Write(Sized) request packet having an address in a predetermined reserved lock release address range. In other embodiments, the lock release request may be implemented through other message formats (e.g., a message packet having a dedicated command encoding for the lock release request, etc.). The arbitrating node responds to the lock release request by further transmitting a broadcast message (Broadcast Message(2) in FIG. 7A) to each of the other processing nodes 72, 74 and 76. The Lock bit (discussed later) in the Broadcast Message(2) is reset to inform each recipient processing node of the completion of lock operations by the lock requesting node 72. In one embodiment, a messaging scheme similar to the one described earlier with reference to lock acquisition is implemented during lock release. In other words, each recipient processing node 72, 74 and 76 may respond to the Broadcast Message(2) by transmitting a corresponding probe response (ProbeResp(2) in FIG. 7A) to the arbitrating node 70, which, in turn, may further send a final target done response (TgtDone(2) in FIG. 7A) to the lock requesting node upon receiving all ProbeResp(2) responses. This messaging scheme completes the sequence of packet transmissions involved in a lock acquisition and subsequent release of the lock. After transmitting the TgtDone(2) response, the arbitrating node may start processing other pending lock requests in its queue.

Figure 7B:
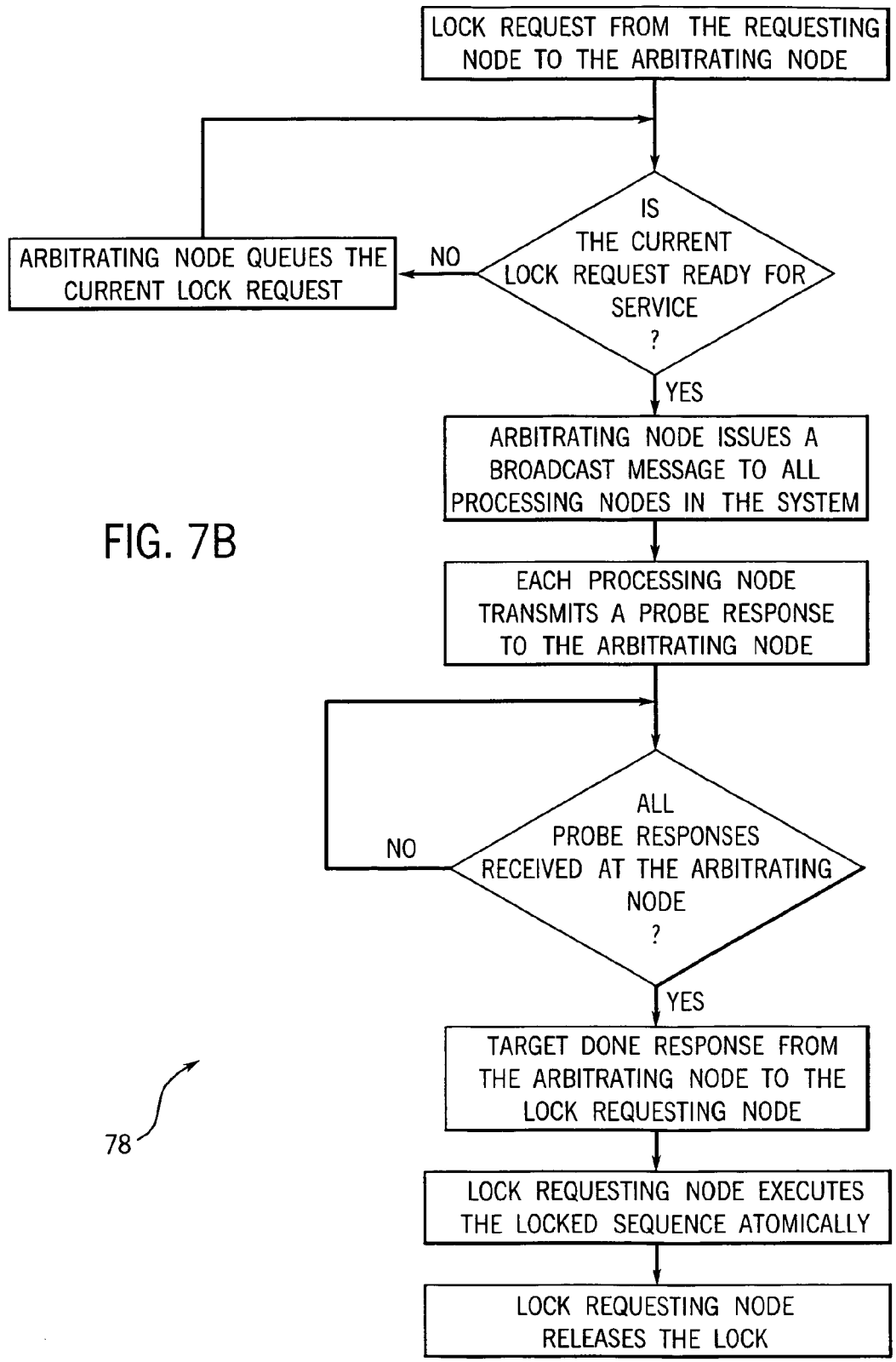
FIG. 7B is an exemplary flowchart for the diagram in FIG. 7A.

Referring now to FIG. 7B, a simplified flowchart 78 for the messaging scheme depicted in FIG. 7A is illustrated. All the operations associated with various blocks in the flow diagram of FIG. 7B have already been explained with reference to FIG. 7A. Lock release operation is not illustrated in detail because it is self-explanatory in view of the earlier discussion.

One embodiment of a Write(sized) packet 80 is shown in FIG. 8A. The SrcNode [2:0] and SrcUnit [1:0] fields are set to the node number and associated unit number of the origin of the request, i.e., lock requesting node 72. As discussed earlier, each processing node within the system 20 has a unique identification number. The node identification number may be permanently stored within each processing node upon fabrication, or may be assigned by the system software upon start-up. Each processing node may also have mapping tables containing node numbers for each remaining processing node within the system so as to facilitate packet generation and routing to appropriate destinations. The DestNode[2:0] and DestUnit[1:0] fields carry the node and unit numbers of the processing node and unit to which the Write(sized) packet should be routed. In the present case, the DestNode and DestUnit fields contain the node and unit numbers of the arbitrating node 70. In an exemplary embodiment, the arbitrating node 70 is node zero (i.e., the processing node having node identification number "0"). The destination node is the final receiver of a packet that may be routed through one or more intermediate processing nodes.

Additionally, the source of the packet (here, the lock requesting node 72) may assign a source tag (SrcTag[4:0]) transmitted during bit time 2. The source tag identifies packets corresponding to a particular transaction initiated by the source node and associated source unit (i.e., each packet corresponding to a particular transaction includes the same source tag). Thus, for example, when the SrcTag field is of five-bit length, the corresponding source unit associated with the source node can have up to 32 ($2^5$) different transactions in progress in the system. Responses from other nodes in the system will be associated to corresponding transactions through the SrcNode, SrcUnit, and SrcTag fields in the responses.

The sized write request may transfer data in bytes or doublewords. The data packet for a sized write request may be similar to the data packet 50 in FIG. 5. The Write(Sized) packet may contain the starting doubleword address of the data (the Addr field) and a set of data elements (bytes or doublewords) to be transferred. Bit 3 in the CMD field, i.e., CMD[2], indicates whether the data elements to be transferred are bytes or doublewords. In one embodiment, a value of binary "1" in the CMD[2] bit denotes transmission of a doubleword, whereas a value of binary "0" in the CMD[2] bit denotes transmission of a byte.

Another feature of the Write(Sized) packet 80 is the Mask/Count field. As mentioned earlier, the Write(Sized) packet from the lock requesting node 72 indicates a zero-length data packet. Thus, in a non-cacheable write operation, the size of data may be less than the size of a cache block. This type of sized write operation is facilitated with the help of the Mask/Count field. The length of the Mask/Count field, in the present example, is shown to be four bits. The Mask/Count field encodes the number of byte or doubleword data elements to be transferred following the write request. Byte writes may transfer any combination of bytes within a naturally aligned address region half-line (e.g., a 32-byte address region). Byte transfers that cross an aligned boundary may be broken into multiple requests, issued in ascending address order. For example, one byte at the end of a first cache line and a second byte from the beginning of a second cache line may require two separate data packets 50.

As previously mentioned, the data packet 50 for a sized write request contains byte enable information in the first doubleword of the data packet 50. The Mask/Count field in the corresponding Write(Sized) packet 80 may be used to indicate the total size (in doublewords) of the data packet 50. This size may also include the doubleword that contains the Mask bits. Therefore, the range of doublewords indicated by the Mask/Count field is from one (one doubleword of mask bits and no data) to nine (one doubleword of mask bits plus eight doublewords of data). This is accommodated by the four-bit long Mask/Count field, with binary 0000 representing one doubleword and binary 1000 representing nine doublewords. The Mask/Count field specifies the length of the data packet 50 independent of the value of the mask bits. In some cases, the mask bits may be zero for corresponding doublewords that are sent through the data packet 50. However, if a mask bit is non-zero, the corresponding doublewords must be sent. In the preferred embodiment, the Write (sized) request from the lock requesting node 72 has the entire mask doubleword with zero value. In such an event, the system performs all activities usually associated with the Write (Sized) request 80; however, no data is written into the destination node (i.e., the arbitrating node 70).

Further, the Write(Sized) packet 80 from the lock requesting node 72 contains a Lock bit (Addr[2]) that is set to indicate a new lock request. The Lock bit is clear to indicate a lock release transaction. Throughout the discussion, the term "set" indicates the binary "1" value, whereas the term "reset" indicates the binary "0" value. However, the opposite convention (i.e., "0" for "set" and "1" for "reset") may be chosen to implement the same functionality. In an exemplary embodiment, the arbitrating node 70 may be configured to recognize the Write(Sized) packet as a lock request based on the content of the Addr field. The CMD field may still indicate that the packet 80 is a Write(Sized) packet, but the Addr field may uniquely identify the packet 80 as a lock request, and not a memory Write operation. The Addr field in the lock request packet 80 may not be associated with any physical memory locations for data storage or retrieval.

FIG. 8B illustrates one embodiment of a broadcast packet, FIG. 8C illustrates a probe response packet, and FIG. 8D illustrates a target done packet. An example of CMD field encodings for these packets is given in FIG. 6. Referring first to the broadcast packet 82, broadcast messages are used to communicate information to all processing nodes in the system. The SrcNode[2:0] and SrcUnit[1:0] fields carry the node and unit numbers of the lock requestor, i.e., the originator of the transaction. Thus, the SrcNode and SrcUnit fields in the broadcast packet 82 and in the Write(Sized) packet 80 from the lock requesting node carry the same information. In general, the SrcNode and SrcUnit fields identify the node and unit which initiated the event that caused the broadcast request.

In one embodiment, a broadcast message is both accepted and forwarded by each recipient processing node, including the node generating the broadcast packet, so as to reach all processing nodes in the system. Each processing node may contain a routing table for use with broadcast packets. The routing table has one entry for each of the processing nodes (as denoted by the TgtNode/TgtUnit fields) within the system. The TgtNode/TgtUnit fields identify the source of the corresponding broadcast packet. In an exemplary embodiment, each entry in the routing table is an eight-bit vector. Each bit in the eight-bit vector identifies one of up to eight interface ports 28 (FIG. 2A) in the present node, and indicates whether or not the broadcast packet is forwarded through the corresponding interface port.

Features that are implemented using a broadcast message have a reserved address range associated with them. This reserved address range and associated features are recognized by all message recipients. Thus, even though the CMD field is the same for all types of broadcast messages, the Addr field conveys information to distinguish one broadcast packet (performing one type of operation) from another broadcast packet (performing a different type of operation). The reserved address range associated with the broadcast messages may be identified by the Addr field. In an exemplary embodiment, half of the reserved addresses may be associated with broadcast packets generated in response to a lock request. These broadcast packets will correspond to the Write(sized) packet 80 (the lock request packet) with the Addr[2] bit (the Lock bit) set. Similarly, half of the reserved addresses may be associated with broadcast packets generated in response to a lock release request. These broadcast packets, however, will correspond to the Write(sized) packet 80 (the lock release request packet) with the Addr[2] bit (the Lock bit) reset.

In the preferred embodiment, the broadcast message packet contains a Response bit (CMD[0]) which indicates whether a response should be generated. Nodes generating broadcast messages which require responses must know how many responses to expect. If a response is required, it is directed to the node and unit identified by the TgtNode and TgtUnit fields in the broadcast packet (e.g., the node and unit which generated the broadcast message). The type of response is specific to the function being implemented. Thus, for example, responding nodes may return a Probe response in response to the broadcast packet associated with the lock request.

The arbitrating node 70 may be configured to generate an appropriate broadcast message in response to the lock request or the lock release request. In one embodiment, the SrcTag field in the broadcast packet 82 may be identical to that in the Write(Sized) packet 80 for a lock request or a lock release request, whatever the case may be. The TgtNode (target node) field in the broadcast message carries the node identification data (or, the node number) for the arbitrating node 70. This TgtNode field data from the broadcast packet 82 may be placed into the DestNode field in the probe response packet 84.

Referring now to FIG. 8C, a block diagram of a probe response packet 84 is shown. The SrcNode[2:0] and SrcUnit[1:0] fields carry the node and unit numbers of the source of the original transaction which led to the probe response, i.e., the lock requestor. The DestNode[2:0] and DestUnit[1:0] fields carry the node and unit numbers of the destination for the probe response packet 84, i.e., the arbitrating node 70. In one embodiment, the DestNode and DestUnit fields are identical to the TgtNode and TgtUnit fields in the broadcast packet which caused the probe response. Similarly, the SrcTag[4:0] field is identical to the SrcTag[4:0] field in the corresponding broadcast message packet, which, in turn, is identical to the SrcTag[4:0] field in the corresponding lock request or the lock release request from the node 72. Thus, the SrcUnit and SrcTag fields maintain the identification of the transaction being carried out among various processing nodes. The Error bit in the probe response is used to indicate an error at the target, e.g., during processing of one or more transactions giving rise to the probe response. The Error bit is set to indicate this error condition to the destination corresponding to the DestNode and DestUnit fields of the probe response. The Error bit is normally set for those conditions in which the error is detected prior to sending the probe response. A later arising error condition may be reported by other methods rather than in the Probe response packet.

Referring now to FIG. 8D, an exemplary Target Done packet 85 is illustrated. The SrcNode[2:0] and SrcUnit[1:0] fields carry the node and unit numbers of the source of the original transaction, i.e., the lock requester 72. The DestNode[2:0] and DestUnit[1:0] fields carry the node and unit numbers of the destination for the Target Done packet 85, i.e., the lock requestor 72. In one embodiment, the SrcTag[4:0] field is identical to the SrcTag[4:0] field in the corresponding broadcast and probe response packets, which, in turn, is identical to the SrcTag[4:0] field in the corresponding lock request or the lock release request from the node 72. Thus, the SrcUnit and SrcTag fields maintain the identification of the transaction being carried out among various processing nodes. The Error bit in the Target Done packet is used to indicate an error at the target, which is recognized before the Target Done response is sent.

It is noted that any of the packets described herein may be implemented using different formats and encodings. The present messaging schemes may also be implemented in a multiprocessing system configuration that is different from that shown in FIG. 2A. Further, any processing node may be a lock requesting node. However, only one processing node may function as an arbitrating node.

The foregoing description discloses a messaging scheme to perform lock transaction within a distributed-memory multiprocessing computer system. The messaging scheme allows for synchronization of processes within a multiprocessing system, but without restricting scalability of the system. Locks may be established without resource contentions or deadlocks among processing nodes. The dual-unidirectional link interconnect architecture may accommodate high-speed packet transmissions among the processing nodes and may allow for end-to-end acknowledgement of request and response packets travelling in the system.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but, on the contrary, the intention is to cover all such modifications, equivalents and alternatives as may fall within the spirit and scope of the present invention as defined by the appended claims.

What is claimed is:

1. In a multiprocessing computer system comprising a plurality of processing nodes interconnected through an interconnect structure, wherein the plurality of processing nodes includes a first processing node, a second processing node, and a third processing node, a method for lock request arbitration comprising:
   receiving a lock request at the second processing node from the first processing node;
   determining, at the second processing node, whether the lock request is ready for service, wherein determining whether the lock request is ready for service comprises the second processing node placing the lock request in a queue and the second processing node monitoring the queue to determine whether the lock request is ready for service;
   issuing a broadcast message from the second processing node to the first and the third processing nodes in response to determining that the lock request is ready for service, wherein the broadcast message informs the third processing node of servicing of the lock request, and wherein the broadcast message includes a lock bit to inform the third processing node of the servicing of the lock request;
   receiving a first probe response at the second processing node from the first processing node in response to sending the broadcast message;
   receiving a second probe response at the second processing node from the third processing node in response to sending the broadcast message, wherein the probe response is sent from the third processing node in response to the third processing node ceasing issuance of new requests;
   in response to receiving the first and second probe response messages, granting lock ownership to the first processing node and transmitting from the second processing node to the first processing node a lock response message to inform the first processing node of the lock ownership.

2. The method as recited in claim 1, wherein monitoring the queue comprises:
   sequentially processing each preceding lock request in the queue.

3. A multiprocessing computer system comprising:
   a plurality of processing nodes interconnected through an interconnect structure to each other and to shared system resources, wherein the plurality of processing nodes comprises:
   a first processing node configured to generate a lock request prior to commencing execution of an operation required access to the shared system resources;
   a second processing node; and a third processing node configured to receive and process the lock request, and transmit a first broadcast message to the first and the second processing nodes in response to determining that the lock request is ready for service, wherein the third processing node comprises a queue for pending lock requests, wherein the third processing node is configured to place the lock request in the queue and to monitor the queue to determine when the lock request is ready for service, wherein the first broadcast message comprises a lock bit, wherein the third processing node is configured to set the lock bit in response to determining the lock request ready for service;

wherein each of the first and the second processing nodes is configured to transmit a corresponding first probe response message to the third processing node in response to receiving the first broadcast message, wherein the second processing node is further configured to cease issuance of new requests and to transmit the corresponding first probe response message upon the cessation of the issuance;

wherein, in response to receiving the corresponding first probe response message from the first and the second processing nodes, the third processing node is configured to grant lock ownership to the first processing node and transmit lock response message to the first processing node to inform the first processing node of the lock ownership.

4. The multiprocessing computer system as recited in claim 3, wherein the interconnect structure includes a plurality of dual-unidirectional links.

5. The multiprocessing computer system as recited in claim 4, wherein each dual-unidirectional link in the plurality of dual-unidirectional links interconnects a respective pair of processing nodes from the plurality of processing nodes.

6. The multiprocessing computer system as recited in claim 4, wherein each dual-unidirectional link in the plurality of dual-unidirectional links performs packetized information transfer.

7. The multiprocessing computer system as recited in claim 3, wherein each of the plurality of processing nodes includes:
   a plurality of circuit elements comprising:
      a processor core,
      a cache memory, and
      a memory controller; and
   a plurality of interface ports, wherein each of the plurality of circuit elements is coupled to at least one of the plurality of interface ports.

8. The multiprocessing computer system as recited in claim 7, wherein the plurality of circuit elements further includes:
   a bus bridge;
   a graphics logic;
   a bus controller; and
   a peripheral device controller.

9. The multiprocessing computer system as recited in claim 7, wherein at least one of the plurality of interface ports in the each of the plurality of processing nodes is connected to a corresponding one of the plurality of dual-unidirectional links.

10. The multiprocessing computer system as recited in claim 3, further comprising:
    a plurality of system memories; and
    a plurality of memory buses, wherein each of the plurality of system memories is coupled to a corresponding one of the plurality of processing nodes through a respective one of the plurality of system buses.

11. The multiprocessing computer system as recited in claim 3, wherein the first processing node is configured to commence the execution of the lock operation after receiving the lock response message, and wherein the first processing node is further configured to transmit a lock release request to the third processing node after completion of the execution of the lock operation.

12. The multiprocessing computer system as recited in claim 11, wherein the third processing node is configured to transmit a second broadcast message to the first and the second processing nodes in response to receiving the lock release request.

13. The multiprocessing computer system as recited in claim 12, wherein each of the first and the second processing nodes is configured to transmit a corresponding second probe response message to the third processing node in response to the second broadcast message.

14. The multiprocessing computer system as recited in claim 13, wherein the third processing node is configured to transmit a second lock response message to the first processing node in response to receiving the corresponding second probe response messages from the first and the second processing nodes.

15. The multiprocessing computer system as recited in claim 14, wherein the third processing node is configured to place a pending lock request into service upon transmission of the second lock response message, and the pending lock request is generated by one of the plurality of processing nodes and is stored within the third processing node.

* * * * *